United States Patent
Sato et al.

(12)

(10) Patent No.: US 6,207,768 B1
(45) Date of Patent: Mar. 27, 2001

(54) COMBINING DIFFERENTLY COLORED POWDER COATINGS WHICH HEAT-CURE TO HOMOGENEOUS HUE

(75) Inventors: Yukiya Sato; Hisakazu Tajima; Katsutoshi Aoki, all of Wakayama; Takehiko Tohjo, Tochigi-ken; Yasunori Inagaki; Masayuki Maruta, both of Wakayama; Shingo Tanaka, Osaka, all of (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 08/978,152

(22) Filed: Nov. 25, 1997

(30) Foreign Application Priority Data

Nov. 28, 1996 (JP) .................................................. 8-334928

(51) Int. Cl.[7] ............................. C08L 63/00; C08L 67/03; C08L 77/12
(52) U.S. Cl. ....................... 525/438; 525/116; 525/119; 525/123; 525/143; 525/162; 525/169; 525/170; 525/182; 525/207; 525/208; 525/217; 525/218; 525/221; 525/423; 525/424; 525/425; 525/426; 525/440; 525/443; 525/444; 525/455; 525/456; 525/481; 525/531
(58) Field of Search ................................. 428/413, 482; 525/438, 533, 934, 116, 119, 123, 143, 162, 169, 170, 182, 208, 217, 207, 218, 221, 423, 424, 425, 426, 440, 443, 444, 455, 456, 481, 531; 523/206

(56) References Cited

U.S. PATENT DOCUMENTS

| | | | | |
|---|---|---|---|---|
| 3,843,571 | * | 10/1974 | Fitzgerald | 260/17 |
| 4,910,287 | * | 3/1990 | McLafferty et al. | 525/437 |
| 5,319,001 | * | 6/1994 | Morgan et al. | 523/205 |
| 5,498,663 | * | 3/1996 | Shimada et al. | 525/54.3 |
| 5,635,548 | * | 6/1997 | Kittle et al. | 523/220 |

FOREIGN PATENT DOCUMENTS

| | | |
|---|---|---|
| 0459048A1 | 12/1991 | (EP) . |
| 0795589A1 | 9/1997 | (EP) . |
| 7-188586 | 7/1995 | (JP) . |
| 8-503239 | 4/1996 | (JP) . |
| 8-143788 | * 6/1996 | (JP) . |
| 10-72557 | 3/1998 | (JP) . |

OTHER PUBLICATIONS

English Abstract of PCT Publication WO94/11446, May 1994.

English Abstract of JP–W–4504431, Aug. 6, 1992.

Patent Abstracts of Japan, Publication No. 08283617 A, Oct. 1996.

Patent Abstracts of Japan, Publication No. 08041384 A, Feb. 1996.

S. Kobayashi et al., "New Powder Coating", Kogyozairyo (Industrial Materials), 43 (6), 52–55 (Jun. 1995) with partial English translation.

M. Nagakura, "Control of Fluidity of Powder Coating and Leveling of Coating Film", Tosogijutsu (Coating Technique), pp. 60–65 (Aug. 1995) with partial English translation.

* cited by examiner

*Primary Examiner*—Robert E. L. Sellers
(74) *Attorney, Agent, or Firm*—Birch, Stewart, Kolasch & Birch, LLP.

(57) ABSTRACT

The combination of powder coatings usable in a coating method comprising mixing two or more powder coatings of which each color is different, wherein each of the powder coatings fuses with each other and is heat-cured, to thereby give a coating film having a homogeneous hue. A powder coating composition comprising two or more powder coatings of which each color is different, wherein each of the powder coatings fuses with each other and is heat-cured, to thereby give a coating film having a homogeneous hue. A coating method comprising the steps of (a) applying to a substrate two or more powder coatings, of which each color is different; (b) heating to fuse with each other each of the two or more powder coatings applied in step (a); and (c) curing the resulting fused product in step (b), to give a coating film having a homogeneous hue.

6 Claims, No Drawings

COMBINING DIFFERENTLY COLORED POWDER COATINGS WHICH HEAT-CURE TO HOMOGENEOUS HUE

BACKGROUND OF THE INVENTION

1. Field of the Invention

The present invention relates to a combination of two or more powder coatings of which each color is different, a powder coating composition comprising two or more powder coatings of which each color is different, a coating method using two or more powder coatings of which each color is different, a coating film or a coated substrate prepared by applying to a substrate two or more powder coatings according to the combination of powder coatings, and a coating film or a coated substrate prepared according to the coating method.

2. Discussion of the Related Art

Conventionally, powder coatings have been prepared by adding numerous color pigments to resins, curing agents, additives, mixing the above components, melt-kneading the mixture, followed by cooling, pulverization, and classification. Therefore, in these powder coatings, the powder coatings have to be prepared for each color needed, so that an enormous number of powder coating products are needed.

By contrast, in order to simplify the toning process, there has been proposed a powder coating prepared by forming a composite of several kinds of colored powders.

However, when the powder coatings of which each color is different are uniformly mixed upon use, in cases where of using the mixed powder coatings with particle sizes exceeding 20 $\mu$m, the particles of the powder coatings of each color can be generally distinguished by gross examination, thereby making it impossible to obtain a coating film having a homogeneous hue.

On the other hand, as disclosed in Japanese Unexamined Patent No. 4-504431, a method of forming a coating film of a desired hue comprising mixing two or more color powders each having an average particle size of 20 $\mu$m or less has been proposed. However, the yield tends to be lowered by down-sizing the particle size to 20 $\mu$m or less, and the particles are likely to be agglomerated when they are in the order of 20 $\mu$m or less, so that the free flowability of the powder coatings becomes poor, thereby giving rise to such problems as lack of handleability.

Also, a method of improving free flowability by granulating powder coatings by adding a granulating agent solution has been proposed. However, such processes require a large number of production steps, undesirably leading to an increase in costs.

One object of the present invention is to provide a combination of two or more powder coatings of which each color is different, to thereby give a coating film having a homogeneous hue.

Another object of the present invention is to provide a powder coating composition comprising two or more powder coatings of which each color is different, to thereby give a coating film having a homogeneous hue.

Another object of the present invention is to provide a coating method using two or more powder coatings of which each color is different, to thereby give a coating film having a homogeneous hue.

Another object of the present invention is to provide a coating film or a coated substrate having a homogeneous hue prepared by applying to a substrate two or more powder coatings, of which each color is different, according to the combination of powder coatings.

Another object of the present invention is to provide a coating film or a coated substrate having a homogeneous hue prepared by applying to a substrate two or more powder coatings, of which each color is different, according to the coating method described above.

These and other objects of the present invention will be apparent from the following description.

SUMMARY OF THE INVENTION

One aspect of the present invention is a combination of powder coatings usable in a coating method comprising mixing two or more powder coatings of which each color is different, wherein each of the powder coatings fuses with each other and is heat-cured, to thereby give a coating film having a homogenous hue.

Another aspect of the present invention is a powder coating composition comprising two or more powder coatings of which each color is different, wherein each of the powder coatings fuses with each other and is heat-cured, to thereby give a coating film having a homogenous hue.

Another aspect of the present invention is a coating method comprising the steps of:

(a) applying to a substrate two or more powder coatings, of which each color is different;

(b) heating to fuse with each other each of the two or more powder coatings applied in step (a); and (c) curing the resulting fused product in step (b), to give a coating film having a homogeneous hue.

Another aspect of the present invention is a coating film or a coated substrate having a homogeneous hue prepared by applying to a substrate two or more powder coatings, of which each color is different, according to the combination of powder coatings described above.

Another aspect of the present invention is a coating film or a coated substrate having a homogeneous hue prepared by applying to a substrate two or more powder coatings, of which each color is different, according to the coating method as described above.

DETAILED DESCRIPTION OF THE INVENTION

The combination of powder coatings of the present invention is a combination of powder coatings usable in a coating method comprising mixing two or more powder coatings of which each color is different, wherein each of powder coatings fuses with each other and is heat-cured, to thereby give a coating film having a homogenous hue.

Here, in the present specification, a coating film having a "homogeneous" hue means that the hue of the formed coated film is made homogenous to an extent that the colors of the mixed powder coatings cannot be distinguished by gross examination. Also, "each of powder coatings fuses" means that molten products of each of powder coatings are mixed with each other, to have a substantially homogenous state.

Each of the embodiments of the combination of the powder coatings of the present invention will be detailed below.

First Embodiment

The First Embodiment is a combination of two or more powder coatings which have such properties that each of the powder coatings does not have thermosetting properties alone at a temperature of 250° C. or less, and is heat-cured with other powder coatings used in combination at a temperature of 250° C. or less when mixed therewith.

The resins usable in the powder coatings in the First Embodiment include any of conventionally known resins without particular limitation. In the present invention, it is desired to adjust the fusing temperature of each of the usable resins such that the resins are together fused upon stoving. Since the fusing temperature of the usable resins is adjusted, curing reaction takes place after fusing together and homogeneously mixing the resins upon stoving, thereby making it possible to obtain a coating film having a homogeneous hue. The fusing temperature of the resins may be adjusted by such methods, for instance, of adjusting the chemical structure of the resins and of adjusting the molecular weight distribution.

In the First Embodiment, for instance, when two powder coatings are respectively denoted by Powder Coating (i) and Powder Coating (ii), each of which does not have thermosetting properties alone at a temperature of 250° C. or less, powder coatings having properties described above can be obtained by suitably selecting a combination of resins usable for Powder Coating (i) and resins usable for Powder Coating (ii), and preparing each of powder coatings according to each of embodiments detailed below.

In other words, the combinations of two or more powder coatings of the First Embodiment are roughly classified into two embodiments:

(1) An embodiment where each of the resins contained in the respective powder coatings is fused with each other to cause curing reaction by the resins themselves at a temperature of 250° C. or less; and (2) An embodiment where no curing reactions take place between resins themselves at a temperature of 250° C. or less, but when adding a curing agent with the resin, the curing agent being reactive with the counterpart resin, each of powder coatings is cured with other powder coatings used in combination at a temperature of 250° C. or less.

(1) Embodiment where each of the resins contained in the respective powder coatings by the resins themselves to cause curing reaction As mentioned above, in this embodiment, the resins contained in the respective powder coatings are fused with each other, thereby making it possible to cause curing reaction by the resins themselves at a temperature of 250° C. or less.

In Embodiment (1), the curing reaction is not carried out until the resins usable in each of the powder coatings are melted with each other upon stoving and uniformly mixed, in which curing reaction one resin acts as a curing agent for the other resin. Therefore, the resulting coating film obtained from such powder coatings has a homogeneous hue. Accordingly, a suitable combination of the functional groups in each resin must be selected so that one resin has a functional group which can act as a curing agent for the other resin.

Concrete examples of combinations of functional groups capable of carrying out curing reaction include:

(I) combinations of one or more members selected from carboxyl group, amino group, phenolic hydroxyl group, and acid anhydride group, with one or more members selected from epoxy groups, glycidyl groups, and groups having one or more unsaturated bonds; and (II) combinations of alcoholic hydroxyl group and an isocyanate group.

In Embodiment (1), preference is given to combination (I). In particular, combinations of one or more members selected from carboxyl groups and amino groups with one or more members selected from epoxy groups and glycidyl groups are more preferred.

Accordingly, the resins usable in each of powder coatings have to be selected such that the combinations of the functional groups owned by each resin may be as described above.

Here, when the powder coatings usable in this embodiment are denoted by Powder Coating A and Powder Coating B, the combinations of the resin usable in each of powder coatings are as follows.

Combination 1:
Resin in Powder Coating A
    Acrylic resin having one or more members selected from carboxyl groups and amino groups; and
Resin in Powder Coating B
    At least one member selected from epoxy resin having one or more epoxy groups, acrylic resin having one or more glycidyl groups, and resin having one or more unsaturated bonds.

Combination 2:
Resin in Powder Coating A
    Polyester resin having one or more carboxyl groups; and
Resin in Powder Coating B
    At least one member selected from epoxy resin having one or more epoxy groups, acrylic resin having one or more glycidyl groups, and resin having one or more unsaturated bonds.

Combination 3:
Resin in Powder Coating A
    Polyester-polyamide resin having one or more members selected from carboxyl groups and amino groups; and
Resin in Powder Coating B
    At least one member selected from epoxy resin having one or more epoxy groups, acrylic resin having one or more glycidyl groups, and resin having one or more unsaturated bonds.

Combination 4:
Resin in Powder Coating A
    Polyamide resin having one or more members selected from carboxyl groups and amino groups; and
Resin in Powder Coating B
    At least one member selected from epoxy resin having one or more epoxy groups, acrylic resin having one or more glycidyl groups, and resin having one or more unsaturated bonds.

Combination 5:
Resin in Powder Coating A
    Resin having one or more phenolic hydroxyl groups; and
Resin in Powder Coating B
    At least one member selected from epoxy resin having one or more epoxy groups, acrylic resin having one or more glycidyl groups, and resin having one or more unsaturated bonds.

Combination 6:
Resin in Powder Coating A
    Acid anhydride resin having one or more acid anhydride groups; and
Resin in Powder Coating B
    At least one member selected from epoxy resin having one or more epoxy groups, acrylic resin having one or more glycidyl groups, and resin having one or more unsaturated bonds.

Combination 7:
Resin in Powder Coating A
    Aminopolyacrylamide resin having one or more amino groups; and Resin in Powder Coating B
  At least one member selected from epoxy resin having one or more epoxy groups, acrylic resin having one or more glycidyl groups, and resin having one or more unsaturated bonds.
Combination 8:
Resin in Powder Coating A
  Melamine resin having one or more alkoxy groups; and
Resin in Powder Coating B
  At least one member selected from polyester resin, acrylic resin, polyol resin, and urethane resin, each having one or more hydroxyl groups.
Combination 9:
Resin in Powder Coating A
  Urethane resin having one or more isocyanate groups; and
Resin in Powder Coating B
  At least one member selected from polyester resin, acrylic resin, polyol resin, and urethane resin, each having one or more hydroxyl groups ; and acrylic resin, polyamide resin, polyester-polyamide resin, and aminopolyacrylamide resin, each having one or more amino groups.
Combination 10:
Resin in Powder Coating A
  At least one member selected from acrylic resin, polyamide resin, polyester-polyamide resin, and aminopolyacrylamide resin, each having one or more amino groups; and
Resin in Powder Coating B
  At least one member selected from polyester resin and acrylic resin, each having one or more carboxyl groups.
Combination 11:
Resin in Powder Coating A
  Acid anhydride resin having one or more acid anhydride groups; and
Resin in Powder Coating B
  At least one member selected from polyester resin, acrylic resin, polyol resin, and urethane resin, each having one or more hydroxyl groups.
  Among them, from the viewpoint of giving good strength of the resulting coating film, at least one of Powder Coating A and Powder Coating B contains one or more resins selected from acrylic resins having one or more members selected from carboxyl groups and amino groups, polyester resins having one or more carboxyl groups, polyester-polyamide resins having one or more members selected from carboxyl groups and amino groups, polyamide resins having one or more members selected from carboxyl groups and amino groups, resins having one or more phenolic hydroxyl groups, and acid anhydride resins having one or more acid anhydride groups; and another powder coating contains one or more resins selected from epoxy resins having one or more epoxy groups, acrylic resins having one or more glycidyl groups, and resins having one or more unsaturated bonds. The above-exemplified resins may be prepared by any conventional methods without particular limitation.
  Incidentally, in Embodiment (1), in a case where the resins are used in the above combinations, curing agents may be optionally used, though not essential. In a case where a curing agent is used, the usable curing agents may be any of various conventionally known curing agents without limitation, provided that a combination of a resin and a curing agent mixed in the same powder coating has to be suitably selected such that the powder coating does not have thermosetting properties alone at a temperature of 250° C. or less.

Specifically, in Embodiment (1), the resins and the curing agents in the powder coating have to be selected such that combinations of the resins and the curing agents in the powder coatings are:

Powder Coating $A$=Resin $A$+Curing Agent $B'$;

and

Powder Coating $B$=Resin $B$+Curing Agent $A'$, wherein Resins A, B denote resins in Powder Coatings A, B, respectively; Curing Agent A' denotes a curing agent reactive with Resin A but unreactive with Resin B; and Curing Agent B' denotes a curing agent reactive with Resin B but unreactive with Resin A.

In this embodiment, a curing agent reactive with a resin contained in one powder coating is contained in the other powder coating. As described above, since a curing agent and a resin unreactive therewith are contained in a single powder coating, a powder coating which does not have thermosetting properties alone at a temperature of 250° C. or less can be prepared.

In addition, in another embodiment where a curing agent is used, a curing agent may be contained in only one of the powder coatings.

Powder Coating $A$=Resin $A$;

and

Powder Coating $B$=Resin $B$+Curing Agent $A'$, wherein Resins A, B and Curing Agent A' are as defined above.

Incidentally, in the present invention, the ratio of Resin A and Resin B in Powder Coatings A and B depends upon the amount of functional groups being present in the resins, and it is desired that the ratio is in the range of 0.8 to 1.2 in terms of the equivalency ratio of functional groups.

Also, the amount of the usable curing agents in the present invention may be of the level required for conventional thermosetting reaction. The amount may depend upon the amount of the functional groups being present in the resins, and it is desired that the molar ratio of the functional groups in the curing agents to that in the resin is from 0.8 to 1.2 in terms of the equivalency ratio of functional groups contained therein.

In this embodiment, curing reaction proceeds by the reaction between Resin A and Resin B and the reaction between Resin A and Curing Agent A'.

In the present invention, examples of combinations of the resins and the curing agents which are reactive to cause curing reaction at a temperature of 250° C. or less, each listed below as either Resin A [Curing Agent A'] or Resin B [Curing Agent B'], include an organopolysiloxane [an aminoxysilane compound], an organopolysiloxane [an alkoxysilane compound], a silicone polymer [a tin compound], a polysulfide polymer [lead dioxide], a urethane resin [an acrylic oligomer], a urethane resin [a polyol compound], a urethane prepolymer [a polyol compound], a polyester resin [a polyepoxy compound], a polyester resin [a poly(acid anhydride) compound], a polyester resin [a polyamine compound], a polyester resin [a melamine compound], a polyester resin having one or more hydroxyl groups at terminus [an alkoxy compound], a polyester resin having one or more carboxyl groups [triglycidyl isocyanurate (hereinafter simply referred to as "TGIC")], a polyester resin having one or more amino groups at terminus [TGIC], a polyester resin having one or more amino groups at terminus [a modified melamine compound], a polyester resin having one or more phenolic hydroxyl groups [TGIC], an unsaturated polyester resin having one or more hydroxyl groups other than phenolic hydroxyl groups at terminus [a melamine compound], an unsaturated polyester resin having one or more hydroxyl groups other than phenolic hydroxyl groups at terminus [2,4,6-triaminopyridine], an epoxy resin [a polyamine compound], an epoxy resin [a poly(acid anhydride) compound], an epoxy resin [a diamine compound], an epoxy resin [2,4,6-triaminopyridine], an epoxy resin [a polycarboxylic acid compound], an acrylic resin having one or more glycidyl groups [2,4,6-triaminopyridine], an acrylic resin having one or more amino groups [TGIC], a polyamide resin [a polycarboxylic acid compound], a polyamide resin having one or more amino groups at terminus [TGIC], a polyester-polyamide resin [a polycarboxylic acid compound], a polyester-polyamide resin [TGIC], a novolak resin [TGIC], an alkoxy resin [a polyol compound], and the like. Here, examples of the diamine compounds include dihydrazide adipate, and the like.

Accordingly, concrete examples of combinations of the resins and the curing agents in Powder Coating A and Powder Coating B include the following without being limited thereto:

Combination 1:
Powder Coating A
 Resin A: Polyamide resin having one or more amino groups at terminus;
Powder Coating B
 Resin B: Epoxy resin having one or more epoxy groups and/or acrylic resin having one or more glycidyl groups; and
 Curing
 Agent A': TGIC.

Combination 2:
Powder Coating A
 Resin A: Polyester-polyamide resin having one or more amino groups at terminus;
Powder Coating B
 Resin B: Epoxy resin having one or more epoxy groups and/or acrylic resin having one or more glycidyl groups; and
 Curing
 Agent A': TGIC.

Combination 3:
Powder Coating A
 Resin A: Epoxy resin having one or more epoxy groups and/or acrylic resin having one or more glycidyl groups;
Powder Coating B
 Resin B: Polyamide resin having one or more amino groups at terminus; and
 Curing
 Agent A': 2,4,6-Triaminopyridine.

Combination 4:
Powder Coating A
 Resin A: Epoxy resin having one or more epoxy groups and/or acrylic resin having one or more glycidyl groups;
Powder Coating B
 Resin B: Polyester-polyamide resin having one or more amino groups at terminus; and
 Curing
 Agent A': 2,4,6-Triaminopyridine.

Combination 5:
Powder Coating A
 Resin A: Acrylic resin having one or more amino groups;
Powder Coating B
 Resin B: Epoxy resin having one or more epoxy groups and/or acrylic resin having one or more glycidyl groups; and
 Curing
 Agent A': TGIC.

(2) Embodiment where no curing reactions take place between the resins themselves at a temperature of 250° C. or less As mentioned above, in this embodiment, no curing reactions take place between the resins themselves, and by using a curing agent with a resin in each of the two powder coatings, powder coatings are fused with each other, thereby causing curing reaction at a temperature of 250° C. or less.

Therefore, when the powder coatings usable in Embodiment (2) are respectively denoted by Powder Coating C and Powder Coating D, it is essential that the resin usable in Powder Coating C and the resin usable in Powder Coating D are selected such that no curing reactions take place even when these resinous components are melted and mixed at a temperature of 250° C. or less.

Specifically, in Embodiment (2), the resins and the curing agents in the powder coating have to be selected such that combinations of the resins and the curing agents in the powder coatings are:

Powder Coating $C$=Resin $C$+Curing Agent $D'$;

and

Powder Coating $D$=Resin $D$+Curing Agent $C'$, wherein Resins C, D denote resins in Powder Coatings C, D respectively, provided that no curing reactions take place between Resin C and Resin D at a temperature of 250° C. or less; Curing Agent C' denotes a curing agent reactive with Resin C but unreactive with Resin D; and Curing Agent D' denotes a curing agent reactive with Resin D but unreactive with Resin C.

In this embodiment, a curing agent reactive with a resin contained in one powder coating is contained in the other powder coating. As described above, since a curing agent and a resin unreactive therewith are contained in a single powder coating, a powder coating which does not have thermosetting properties alone at a temperature of 250° C. or less can be prepared.

Combinations of resins and curing agents which react with each other to cause curing reaction at a temperature of 250° C. or less are not particularly limited as long as the above-described relationships are satisfactorily met.

Therefore, concrete examples of combinations of resins and curing agents in Powder Coatings C and D include the following, without being limited thereto.

Combination 1:
Powder Coating C
 Resin C: Polyester resin having one or more hydroxyl groups at terminus;
 Curing
 Agent D': TGIC;
Powder Coating D
 Resin D: Polyester-polyamide resin having one or more amino groups at terminus; and Curing
  Agent C': Alkoxy compound.
Combination 2:
Powder Coating C
  Resin C: Epoxy resin having one or more epoxy groups and/or acrylic resin having one or more glycidyl groups;
  Curing
  Agent D': Alkoxy compound;
Powder Coating D
  Resin D: Polyester resin having one or more hydroxyl groups other than phenolic hydroxyl groups at terminus; and
  Curing
  Agent C': Diamine compound.
Combination 3:
Powder Coating C
  Resin C: Alkoxy resin;
  Curing
  Agent D': TGIC;
Powder Coating D
  Resin D: Polyester-polyamide resin having one or more amino groups at terminus; and
  Curing
  Agent C': Polyol compound.
Combination 4:
Powder Coating C
  Resin C: Epoxy resin having one or more epoxy groups and/or acrylic resin having one or more glycidyl groups;
  Curing
  Agent D': Melamine compound;
Powder Coating D
  Resin D: Polyester resin having one or more hydroxyl groups other than phenolic hydroxyl groups at terminus; and
  Curing
  Agent C': Diamine compound.
Combination 5:
Powder Coating C
  Resin C: Unsaturated polyester resin having one or more hydroxyl groups other than phenolic hydroxyl groups at terminus;
  Curing
  Agent D': TGIC
Powder Coating D
  Resin D: Polyester resin having one or more phenolic hydroxyl groups; and
  Curing
  Agent C': Melamine compound.
Combination 6:
Powder Coating C
  Resin C: Urethane prepolymer having one or more —NCO groups at terminus;
  Agent D': TGIC;
Powder Coating D
  Resin D: Polyester-polyamide resin having one or more amino groups at terminus; and
  Agent C': Polyol compound.

Incidentally, in the combinations of the epoxy resins and the polyester resins, depending upon the kinds of the functional groups owned by the polyester resins, in some cases curing reaction may take place by using a curing agent together with the resin as shown in Table 2, in addition to the combinations where curing reaction takes place between the resins themselves described above.

The resins usable in the powder coatings in the First Embodiment are as described above, among which in both Embodiments (1) and (2), particular preference is given to the resins each having two or more functional groups per molecule which can participate in a thermosetting reaction from the aspect of improving the strength in the resulting coating film. When the resin mentioned above is used, the strength of the resulting coating film can be remarkably improved.

In the present invention, concrete examples of the functional groups which can participate in the thermosetting reaction include carboxyl group, amino group, hydroxyl group, glycidyl group, isocyanate group, and the like.

In the present invention, the number of functional groups per molecule in the resin can be calculated from at least one value of an acid value, an amine value, a hydroxyl value, an oxirane value, and the like, and a number-average molecular weight measured by using gel permeation chromatography (GPC).

In the powder coatings in the First Embodiment, depending upon each of the embodiments, suitably selected curing agents may be used in addition to the resin as described above. Also, colorants, various additives, and the like may be further optionally added thereto.

The colorants usable in the present invention may be any of known ones without particular limitation, which may be suitably selected depending upon the desired tone. Concrete examples thereof include titanium oxide, carmine 6B, carbon blacks, copper phthalocyanine, acetoacetic acid arylamide-based monoazo yellow pigments, dis-azo yellows, pigment reds, and the like. The amount thereof is preferably from about 5 to about 60 parts by weight, based on 100 parts by weight of the resin.

The additives usable in the present invention may be any of known ones usable in the composition of powder coatings without particular limitation. Examples thereof include levelling agents, such as acrylate polymers, crosslinking accelerators, such as various catalysts and organotin compounds, pinhole preventives, such as benzoin. Each of the additives may be preferably added in an amount of from about 0.1 to about 5 parts by weight, based on 100 parts by weight of the resins.

The powder coating usable in the present invention may be prepared by melt-kneading each of the above components using an extruder. After cooling the resulting kneaded mixture, it is subjected to physical pulverization using pulverizing devices, such as hammer mills and jet mills, and then the pulverized product is classified using classifiers, such as air classifiers and micron-classifiers, to give powder coatings of desired average particle sizes. Also, in the present invention, flowability controlling agents, such as silica, alumina, titania, and zirconia may be further added to the surface of the powder coating.

It is desired that the average particle size of the powder coating usable in the present invention is 1 $\mu$m or more, preferably 5 $\mu$m or more, from the viewpoint of inhibiting agglomeration of the powder coating particles and uniformly mixing the two or more powder coatings. Also, it is desired that the average particle size is 50 $\mu$m or less, preferably 30 $\mu$m or less, from the viewpoint of inhibiting excessive thickening of the resulting coating film. Here, the average particle size of the powder coatings may be measured by Coulter counter method. Also, in the present invention, since the homogeneous coating film can be prepared by fusing the powder coatings upon mixing and applying the powder coatings, the powder coatings having average particle sizes of 20 to 50 μm may be used without any problems.

In the present invention, it is desired that the triboelectric charges of the powder coatings are controlled within a desired range. Methods for controlling triboelectric charges include a method by adjusting acid values, amine values, etc. of the resin; a method by adjusting charges and amounts of the colorants; a method by adding various additives, such as quaternary ammonium salts, dyes, and metallic soaps; and a method by adjusting the amounts of such agents as silica, alumina, titania, and zirconia, the agents being added to adjust flowability. For instance, in a case where a resin having a high acid value is used as a raw material, negative triboelectric charges increase.

In the present invention, an example of a method for measuring triboelectric charges of each of powder coatings is as follows. First, a powder coating is applied using the coating machine and the substrate to be coated under working conditions, such as applied voltage, amount of coating feed, and the like. After air blowing-off of the powder from the substrate, a difference in voltage owing to the efflux of electric charges from the substrate and the amount of the powder coatings removed are measured. Alternatively, as a simple method, the triboelectric charge is measured by a blow-off method when each of the powder coatings is mixed with various powder coatings having particle sizes larger than that of the powder coating to be tested.

In the present invention, it is desired that each of differences in triboelectric charges of two or more powder coatings mixed is 5.0 μC/g or less. In other words, in a case, for example, where three kinds of powder coatings A, B, and C are mixed, each of the differences in the triboelectric charges between A and B, between B and C, and between A and C is preferably 5.0 μC/g or less. When the difference in the triboelectric charges is 5.0 μC/g or less, the concentration of the electric lines of forces at the edge portion of the substrate to be coated can be avoided during coating, so that those having high triboelectric charges are unlikely to be agglomerated at the edge portion, thereby making it possible to obtain a coating film having a homogeneous hue.

The powder coatings usable in First Embodiment described above have such properties that each of the powder coatings does not have thermosetting properties alone at a temperature of 250° C. or less, and is heat-cured with other powder coatings used in combination at a temperature of 250° C. or less when mixed therewith. In other words, each of powder coatings is melted and sufficiently uniformly mixed and then heat-cured during the stoving process, thereby making it possible to give a coating film having a homogenous hue.

The powder coatings usable in the First Embodiment feature in the adjustment of each of the powder coatings such that each of the powder coatings does not have thermosetting properties alone at a temperature of 250° C. or less. Since conventionally known powder coatings cause thermosetting reaction by themselves at a temperature of 250° C. or less, when mixing two or more powder coatings and applying them to a substrate, the resins usable in each of the powder coatings are fused and immediately cured during the stoving process, so that it is practically impossible to obtain a uniform mixture by mixing the two or more powder coatings. Consequently, the particles in each of the powder coatings are visualized by gross examination after curing reaction, so that the resulting coating film does not have a homogenous hue.

By contrast, in Embodiment (1) where curing agents are not essential, by mixing the two or more powder coatings having such properties that each of the powder coatings does not have thermosetting properties alone at a temperature of 250° C. or less and is heat-cured with other powder coatings used in combination at a temperature of 250° C. or less when mixed therewith and applying the powder coatings to a substrate, the curing reaction is not carried out until the resins usable in each of the powder coatings are melted with each other upon stoving and uniformly mixed, in which curing reaction one resin acts as a curing agent for the other resin. Therefore, the resulting coating film obtained from such powder coatings has a homogeneous hue.

On the other hand, in Embodiment (2) where curing agents are used, a resin and a curing agent contained in a single powder coating are selected such that they are unreactive with each other. Therefore, no curing reaction takes place by a single powder coating, and by fusing two or more powder coatings during stoving, curing reaction is caused by the action of a curing agent contained in a counterpart powder coating, so that the resulting coating film having a homogeneous hue can be obtained. This is because the curing agent reactive with a resin contained in one powder coating is contained the other powder coating, which is different from prior art where the resin and the curing agent which are reactive with each other are contained in the same powder coating, so that the initiation of the curing reaction may be delayed, the curing reaction occurring only after the resins are uniformly fused with each other.

In the First Embodiment, the two or more powder coatings may be used in combination referring to the embodiment for the combination of the resins described above, and in the combination of these powder coatings, it is desired that a difference in melt viscosities of the two or more powder coatings is not more than 20 pa·s, preferably not more than 15 pa·s, more preferably not more than 10 pa·s, at a temperature corresponding to 90% of a curing initiation temperature of a mixture of the two or more powder coatings of which each color is different from the viewpoints of obtaining excellent gloss and strength in the resulting coating film. In other words, in a case, for example, where three kinds of powder coatings A, B, and C are mixed, each of the differences in the melt viscosities between A and B, between B and C, and between A and C is preferably not more than 20 pa·s.

In the present invention, the curing initiation temperature of the mixture of powder coatings is obtained from the kickoff of the exothermic peak measured when using a differential scanning calorimeter ("DSC Model 210," manufactured by Seiko Instruments, Inc.), and heating at a heating rate of 10° C./min.

In the present invention, the melt viscosities of the powder coatings may be measured by DYNAMIC ANALYZER "RDA-II" (manufactured by Rheometrics, Inc.) under the following measurement conditions:

Geometry: Parallel plate (radius: 12.5 mm)
Frequency: 62.8 rad/sec
Strain: 2%

In the present invention, methods of adjusting melt viscosities of the powder coatings include any general methods for adjusting melt viscosities of resins. For instance, the melt viscosities of the resins may be adjusted by controlling the backbone structure, the molecular weight, the molecular weight distribution, the crosslinking degree, and the like, of the resins. Alternatively, the melt viscosities of the powder coatings may be adjusted by adding such additives as fillers, and the like.

Second Embodiment

The Second Embodiment is a combination of two or more powder coatings where a difference between a softening point of a powder coating having the highest softening point and a curing initiation temperature of a mixture of the two or more powder coatings is not less than 10° C., preferably not less than 20° C., more preferably not less than 30° C.

The powder coatings usable in the Second Embodiment are not particularly limited as long as the softening point and the curing initiation temperature are as defined in this embodiment. Specifically, in the combinations of the two or more powder coatings in this embodiment, not only the powder coatings in the First Embodiment are usable, but also any of conventionally employed powder coatings are usable, to give a coating film having a homogeneous hue. In other words, any combinations of known powder coatings which are heat-cured alone at a temperature of 250° C. or less may be encompassed by this embodiment, provided that a difference between a softening point of a powder coating having the highest softening point and a curing initiation temperature of a mixture of the two or more powder coatings is not less than 10° C., to give a coating film having a homogeneous hue.

In the Second Embodiment, by adjusting the difference between a softening point of a powder coating having the highest softening point and a curing initiation temperature of a mixture of the two or more powder coatings within the above-specified range, each of the powder coatings is sufficiently melted and mixed to initiate curing reaction, so that a coating film having a homogeneous hue can be obtained even when the powder coatings having average particle sizes of 20 $\mu$m or more are used.

The curing initiation temperature of the powder coatings may be obtained in the same manner as described above.

The softening point of the powder coating is measured by a method according to ASTM E28-67.

Examples of conventionally known powder coatings include those comprising resins, curing agents, additives, colorants, and the like. As for the resins, any of conventionally known resins may be usable without particular limitation. Examples of the resins include non-reactive resins, such as polyethylenes, nylon resins, vinyl chloride, and the like; and reactive resins, such as epoxy resins, polyester resins, acrylic resins, and the like. Among them, preference is given to the polyester resins, the epoxy resins, and the acrylic resins. Also, even in cases where known powder coatings are used, it is desired that resins each having two or more functional groups per molecule which can participate in the thermosetting reaction are used from the viewpoint of improving the strength of the resulting coating film.

In Second Embodiment, it is desired that the powder coatings are stoved until the curing reaction is sufficiently terminated in a temperature range of 70 to 130% of an exothermic peak temperature for curing reaction of the powder coatings to be stoved.

The term "exothermic peak temperatures for curing reaction" refers to a temperature at a peak value of the exothermic curve measured when using a differential scanning calorimeter. Here, the exothermic peak temperature can be obtained at a peak value of the exothermic curve measured when using a differential scanning calorimeter ("DSC Model 210," manufactured by Seiko Instruments, Inc.), and heating at a heating rate of 10° C./min. The time required until the curing reaction is terminated can be obtained from the time required for terminating the exothermic peak using the differential scanning calorimeter set by the stoving temperature.

As described above, there are the two embodiments in the combination of the powder coating of the present invention. In either embodiment, it is desired that the curing temperature of the mixture of two or more powder coatings used in combination is less than 250° C., preferably 230° C. or less, more preferably 200° C. or less, from the viewpoint of inhibition of thermal decomposition and cost reduction.

In the present invention, the curing temperature may be calculated from the exothermic peak top temperature measured when the differential scanning calorimeter ("DSC Model 210," manufactured by Seiko Instruments, Inc.) is used, and the temperature is raised at a heating rate of 10° C./min.

Further, the present invention provides a powder coating composition containing two or more powder coatings used in combination as described above.

In other words, the powder coating composition of the present invention comprises two or more powder coatings of which each color is different, wherein each of the powder coatings fuses with each other and is heat-cured, to thereby give a coating film having a homogenous hue.

When the two or more powder coatings are mixed to give a desired hue, the mixing proportions may be suitably selected depending upon the desired hue. The methods for preparing powder coating compositions comprising mixing powder coatings may be any of conventionally known methods, including such dry-blending methods using a high-speed agitator, such as a Henschel mixer and a Super Mixer.

By mixing and applying two or more powder coatings used in combination according to the present invention to a substrate or by applying a powder coating composition of the present invention to a substrate, a coating film having a homogeneous hue can be obtained.

Incidentally, in the present specification, the term "mixing and applying" means that the two or more powder coatings are mixed and applied to a substrate. The term "applying" used in the present specification refers to a series of treatments for forming a coating film comprising applying the powder coatings to a substrate by various methods described below, and then stoving at a temperature of 100° to 200° C.

In the case where the two or more powder coatings are mixed and applied, the powder coatings usable in the combination may be previously mixed, or the two or more powder coatings may be applied using an electron gun, while mixing the two or more powder coatings. Here, the method of previously mixing the powder coatings may be the same one as described above.

Also, the means of coating are not particularly limited, and examples of the coating methods include coating methods using electrostatic sprayers, fluidized bed coating methods, plastic flame spraying methods, and the like.

The coating film and the coated substrate prepared by applying to a substrate two or more powder coatings according to the combination of powder coatings of the present invention each has a homogeneous hue, even when each of powder coatings has different color.

Next, the coating method of the present invention will be described below.

The coating method of the present invention comprises the steps of:

(a) applying to a substrate two or more powder coatings, of which each color is different;

(b) heating to fuse with each other each of the two or more powder coatings applied in step (a); and (c) curing the resulting fused product in step (b), to give a coating film having a homogeneous hue.

In one embodiment of the coating method of the present invention, step (c) is carried out by heat-curing the resulting fused product in step (b).

In this embodiment, not only the powder coatings usable in First Embodiment but also any of generally known powder coatings may be used. In other words, the powder coatings usable herein may be those which may or may not be cured alone at a temperature of 250° C. or less, and each of powder coatings fuses with each other and is heat-cured in a well-melted state. In this embodiment, in the case where the powder coatings usable in the combination of the present invention are used, this embodiment would be substantially the same as the embodiment for the coating method described above, in which case it is characterized in that the powder coatings are preheated and fused prior to thermosetting.

Step (a) in this embodiment comprises applying to a substrate two or more of the above powder coatings, of which each color is different. When applying these powder coatings, the powder coatings may be previously mixed to prepare a mixture of the two or more powder coatings, or each of powder coatings may be independently used. The method for applying the powder coatings and the method for previously mixing two or more powder coatings may be the same as above. The amount of each of the powder coatings used in mixed colors is suitably selected depending upon the desired hue obtained by mixing colors.

Step (b) comprises heating to fuse with each other each of the two or more powder coatings applied in step a). In the present invention, prior to step (c), the two r more powder coatings applied to the substrate may be heated and fused, to thereby obtain a coating film having a homogeneous hue.

It is desired that the heating temperature of the powder coatings in step (b) mentioned above is less than the curing initiation temperature of the applied powder coatings, preferably at a temperature lower than the curing initiation temperature by 2° C. or more, more preferably at a temperature lower than the curing initiation temperature by 5° C. or more, from the aspect of fusing the powder coatings without undergoing curing reaction and sufficiently mixing the two or more powder coatings.

It is desired that heating of the powder coatings in step (b) mentioned above is carried out in a length sufficient for fusing the powder coatings. The fusing state of the powder coatings can be determined by gross examination.

Step (c) in this embodiment comprises heat-curing the resulting fused product in step (b), to give a coating film having a homogeneous hue.

It is desired that step (c) mentioned above is carried out at a temperature 70% or more, preferably 80% or more, of the exothermic peak temperature for curing reaction from the viewpoint of reaction efficiency, and it is desired that step (c) is carried out at a temperature 130% or less, preferably 110% or less, of the exothermic peak temperature for curing reaction from the viewpoint of cost reduction and inhibition of decomposition of the ingredients.

Here, the exothermic peak temperature for curing reaction may be obtained by the method described above.

The time for curing the powder coatings is not particularly limited, and it is desired that the time therefor is from 10 to 40 minutes.

In another embodiment of the coating method of the present invention, step (c) is carried out by irradiating light to the resulting fused product in step (b). In other words, photosetting reaction is used in place of thermosetting reaction.

Step (a) in this embodiment comprises applying to a substrate two or more of the above powder coatings, each of which color is different, and this step may be carried out in the same manner as in step (a) of one embodiment described above.

Step (b) comprises heating to fuse with each other each of the two or more powder coatings applied in step (a). In the present invention, the two or more powder coatings applied to the substrate may be heated and fused prior to step (c), to thereby obtain a coating film having a homogeneous hue.

It is desired that the heating temperature of the powder coatings in step (b) mentioned above is 90% or more, preferably 95% or more, of the highest softening point among the resins contained in the powder coatings from the viewpoint of melt viscosities, and it is desired that the heating temperature is 150% or less, preferably 130% or less, of the highest softening point among the resins contained in the powder coatings from the viewpoint of cost reduction and thermal decomposition.

In the present invention, the softening points of the resins usable in the powder coatings are measured by a method according to ASTM E28-67.

The heating time of the powder coatings in step (b) mentioned above is not particularly limited, and it is desired that the heating time is from 10 to 40 minutes.

By carrying out step (b) mentioned above, the resins, the photoinitiator, and the like can be sufficiently mixed.

Step (c) in this embodiment comprises curing the fused product obtained in step (b) by irradiating light to the resulting fused product, to thereby form a coating film having a homogeneous hue.

This embodiment is advantageous in that a low-temperature stoving can be made possible in the formation of the coating film by utilizing photosetting reaction, which comprises curing the powder coatings by irradiating light. As a result, the powder coating to such materials as wood, plastics, and the like having low heat resistance can be made possible, which in turn leads to reduction of the running costs.

Step (c) mentioned above is carried out, for instance, by irradiating light using an ultraviolet light (UV), an electron beam, and the like. Among these methods, from the viewpoint of cost reduction and handleability, preference is given to a method of irradiating light using the ultraviolet light (UV).

In this embodiment, in the case where step (c) is carried out by irradiating the ultraviolet light (UV), it is desired that a photoinitiator is added to the usable powder coating together with the additives mentioned above.

The time for curing the powder coatings is not particularly limited, and it is desired that the time therefor is from 30 seconds to 10 minutes.

The powder coatings usable in the coating method of this embodiment may be any of conventionally used ones without particularly limitation, as long as the powder coatings each comprises a resin, a photoinitiator, additives, a colorant, and the like.

The resins usable in the powder coatings may be any of conventionally known ones without particular limitation as long as the resins can be cured by irradiating light. Concrete examples thereof include polyester acrylate resins, epoxy acrylate resins, epoxy methacrylate resins, urethane acrylate resins, polystyryl methacrylate resins, polyether methacrylate resins, polyol resins, and the like, among which preference is given to the epoxy acrylate resins.

Concrete examples of the photoinitiators include benzoin propyl ether, benzoin isopropyl ether, benzoin ethyl ether, benzil, dimethyl ketal, isopropyl thioxanthone, 2-methyl thioxanthone, 2,4-diethyl thioxanthone, benzophenone, benzoin benzoate, and the like, among which preference is given to benzoin isopropyl ether.

It is desired that the amount of the photoinitiator mentioned above is from about 1 to about 15 parts by weight, based on 100 parts by weight of the resin.

Examples of the additives mentioned above may be the same ones as those listed above, and it is desired that each of the additives is added in an amount of from about 0.1 to about 5 parts by weight, based on 100 parts by weight of the resin.

Examples of the colorants mentioned above may be the same ones as those listed above, and it is desired that the amount of the colorants is about 5 to 60 parts by weight, based on 100 parts by weight of the resin.

The powder coatings usable in this embodiment may be prepared in the same manner as above using the resins, the photoinitiators, the additives, the colorants, and the like mentioned above.

As for the powder coatings usable in this embodiment, those powders having an average particle size of from 1 to 50 $\mu$m, preferably from 5 to 30 $\mu$m may be used, as in the case of the powder coatings usable in the First Embodiment. In particular, it is highly desired that the average particle size is from 10 to 20 $\mu$m from the viewpoint of handleability.

Incidentally, it is desired that the powder coatings usable in this embodiment also have their triboelectric charges controlled in the given ranges as in the case of the powder coatings in the First Embodiment described above. It is desired that each of differences in triboelectric charges of two or more powder coatings mixed is 5.0 $\mu$C/g or less.

As described above, in various embodiments for the coating methods of the present invention, the powder coatings are fused by heating upon stoving and then uniformly mixing, which results in effecting thermosettingreaction. Therefore, the coating film and the coated substrate have a homogeneous hue, the coating film and the coated substrate being prepared by applying to a substrate two or more powder coatings, of which each color is different, according to the coating method described above. In the present invention, since a homogeneous hue can be obtained by the above mechanisms, a homogeneous hue can be obtained even if the particle size of the powder coatings is larger than 20 $\mu$m.

According to the present invention, it is made possible to obtain a coating film having a homogeneous hue by mixing colors of powders having different tones. Therefore, by furnishing several tones of powders including those with primary colors, powders with all sorts of tones can be obtained, so that it is no longer necessary to prepare a large number of tones as conventionally required.

EXAMPLES

The present invention will be explained in further detail by means of the following working examples, without intending to limit the scope of the present invention thereto in any manner.

In the following working examples, acid values of the resulting resins, average particle sizes and softening points of the powder coatings, curing initiation temperatures and exothermic peak temperatures for curing reaction of mixtures of the powder coatings were evaluated by each of the following methods:

Acid Value
 Measured by a method according to JIS K0070.
Average Particle Size
 The average particle size is measured using a Coulter-Multisizer (manufactured by Coulter K.K.).

Softening Point
 Measured by a method according to ASTM E28-67.
Curing Initiation Temperature
 Obtained from the kickoff of the exothermic peak measured when using a differential scanning calorimeter ("DSC Model 210," manufactured by Seiko Instruments, Inc.), and heating at a heating rate of 10° C./min.
Exothermic Peak Temperatures for Curing Reaction
 Temperature obtained at the peak of the exothermic curve measured when using a differential scanning calorimeter ("DSC Model 210," manufactured by Seiko Instruments, Inc.), and heating at a heating rate of 10° C./min.

Also, gloss, pencil hardness, and solvent resistance of the resulting coating films were evaluated by the following methods.

Gloss
 Measured by using a glossmeter "GM-60" (manufactured by Minolta Co., Ltd.) by a method according to ASTM 3363-74.
Pencil Hardness
 Measured by a method according to JIS K5400 8.4.
Solvent Resistance
 Acetone is applied to a piece of tissue paper, and the coating film is rubbed therewith backward and forward ten times. The thicknesses of the coating films before and after the test are measured by a method according to JIS K5400 3.5. The solvent resistance is evaluated as the difference of the thicknesses before and after the test obtained above.

Resin Preparation Example 1-1
 A three-liter four-necked flask equipped with a thermometer, a stainless stirring rod, a reflux condenser, and a nitrogen inlet tube was charged with 750 g (2 mol) of ethylene oxide adduct of bisphenol A and 438.6 g (3 mol) of adipic acid, and the ingredients were heated to 230° C. and reacted. Thereafter, 272.4 g (2 mol) of m-xylylenediamine was added to the above mixture to form a polyamide.

The degree of polymerization was monitored from a softening point measured by the method according to ASTM E28-67, and the reaction was terminated when the softening point reached 90° C., to give a polyester-polyamide resin. The resulting resin had an amine value of 100 KOH mg/g. Here, the amine value is measured by a method according to ASTM D2073-66. This resulting resin is referred to as "Binder Resin 1-A."

Resin Preparation Example 1-2
 A three-liter four-necked flask equipped with a thermometer, a stainless stirring rod, a reflux condenser, and a nitrogen inlet tube was charged with 750 g (2 mol) of ethylene oxide adduct of bisphenol A, 166 g (1 mol) of terephthalic acid, and 292.4 g (2 mol) of adipic acid, and the ingredients were heated to 230° C. and reacted. Thereafter, 272.4 g (2 mol) of m-xylylenediamine was added to the above mixture to form a polyamide.

The degree of polymerization was monitored from a softening point measured by the method according to ASTM E28-67, and the reaction was terminated when the softening point reached 90° C., to give a polyester-polyamide resin. The resulting resin had an amine value of 80 KOH mg/g. Here, the amine value is measured by a method according to ASTM D2073-66. This resulting resin is referred to as "Binder Resin 1-B."

Resin Preparation Example 1-3
 A three-liter four-necked flask equipped with a thermometer, a stainless stirring rod, a reflux condenser, and a nitrogen inlet tube was charged with 186 g (3 mol) of ethylene glycol, 728 g (7 mol) of neopentyl glycol, 1494 g (9 mol) of terephthalic acid, and 192 g (1 mol) of trimellitic anhydride, and the ingredients were heated to 220° C. and reacted.

The degree of polymerization was monitored from a softening point measured by the method according to ASTM E28-67, and the reaction was terminated when the softening point reached 90° C., to give a polyester resin. The resulting resin had an acid value of 52.4 KOH mg/g. This resulting resin is referred to as "Binder Resin 1-C."

Resin Preparation Example 1-4

A three-liter four-necked flask equipped with a thermometer, a stainless stirring rod, a reflux condenser, and a nitrogen inlet tube was charged with 186 g (3 mol) of ethylene glycol, 728 g (7 mol) of neopentyl glycol, and 1743 g (10.5 mol) of terephthalic acid, and the ingredients were heated to 220° C. and reacted.

The degree of polymerization was monitored from a softening point measured by the method according to ASTM E28-67, and the reaction was terminated when the softening point reached 90° C., to give a polyester resin. The resulting resin had an acid value of 52.5 KOH mg/g. This resulting resin is referred to as "Binder Resin 1-D."

| Preparation Example 1-1 of Powder Coating | |
|---|---|
| Epoxy Resin (Solid Epoxy Resin manufactured by Mitsui Petrochemical Industries, Ltd.) | 100 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 27 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-1).

| Preparation Example 1-2 of Powder Coating | |
|---|---|
| Polyester-Polyamide Resin (Binder Resin 1-A; amine value: 100 KOH mg/g) | 100 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |

The same procedures as in Preparation Example 1-1 of Powder Coating were carried out using the above components, to give a powder having an average particle size of 29 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-2).

| Preparation Example 1-3 of Powder Coating | |
|---|---|
| Polyester-Polyamide Resin (Binder Resin 1-B; amine value: 80 KOH mg/g) | 100 parts by weight |
| Copper Phthalocyanine ("CYANINE BLUE-KRS," manufactured by SANYO COLOR WORKS, LTD.) | 6 parts by weight |
| Levelling Agent ("ACRONAL 4F," manufactured by BASF) | 1 part by weight |

The same procedures as in Preparation Example 1-1 of Powder Coating were carried out using the above components, to give a powder having an average particle size of 28 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-3).

| Preparation Example 1-4 of Powder Coating | |
|---|---|
| Polyester Resin ("ER-8107," manufactured by Nippon Ester Co., Ltd., acid value = 32.5 KOH mg/g) | 40 parts by weight |
| Polyester Resin ("ER-8100," manufactured by Nippon Ester Co., Ltd., acid value = 65.8 KOH mg/g) | 54 parts by weight |
| TGIC ("ARALDITE PT810," manufactured by Ciba Geigy AG) | 18 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 1-1 of Powder Coating were carried out using the above components, to give a powder having an average particle size of 27 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-4).

| Preparation Example 1-5 of Powder Coating | |
|---|---|
| Polyester Resin ("ER-8107," manufactured by Nippon Ester Co., Ltd., acid value = 32.5 KOH mg/g) | 40 parts by weight |
| Polyester Resin ("ER-8100," manufactured by Nippon Ester Co., Ltd., acid value = 65.8 KOH mg/g) | 54 parts by weight |
| TGIC ("ARALDITE PT810," manufactured by Ciba Geigy AG) | 18 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |
| Benzoin | 0.5 parts by weight |

The same procedures as in Preparation Example 1-1 of Powder Coating were carried out using the above components, to give a powder having an average particle size of 28 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-5).

Preparation Example 1-6 of Powder Coating

| | |
|---|---|
| Polyester Resin ("ER-8107," manufactured by Nippon Ester Co., Ltd., acid value = 32.5 KOH mg/g) | 40 parts by weight |
| Polyester Resin ("ER-8100," manufactured by Nippon Ester Co., Ltd., acid value = 65.8 KOH mg/g) | 54 parts by weight |
| TGIC ("ARALDITE PT810," manufactured by Ciba Geigy AG) | 18 parts by weight |
| Copper Phthalocyanine ("CYANINE BLUE-KRS," manufactured by SANYO COLOR WORKS, LTD.) | 6 parts by weight |
| Levelling Agent ("ACRONAL 4F," manufactured by BASF) | 1 part by weight |
| Benzoin | 0.5 parts by weight |

The same procedures as in Preparation Example 1-1 of Powder Coating were carried out using the above components, to give a powder having an average particle size of 29 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-6).

Preparation Example 1-7 of Powder Coating

| | |
|---|---|
| Epoxy Resin (Solid Epoxy Resin manufactured by Mitsui Petrochemical industries, Ltd.) | 100 parts by weight |
| Melamine Compound ("Resimene 747," manufactured by Monsanto) | 39 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |

The same procedures as in Preparation Example 1-1 of Powder Coating were carried out using the above components, to give a powder having an average particle size of 29 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-7).

Preparation Example 1-8 of Powder Coating

| | |
|---|---|
| Polyester Resin ("ER-6620," manufactured by Nippon Ester Co., Ltd., acid value = 0.8 KOH mg/g, hydroxyl value = 42.9 KOH mg/g) | 100 parts by weight |
| Dihydrazide adipate | 9 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |

The same procedures as in Preparation Example 1-1 of Powder Coating were carried out using the above components, to give a powder having an average particle size of 28 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-8).

Preparation Example 1-9 of Powder Coating

| | |
|---|---|
| Epoxy Resin ("EPICOAT 1044AF," manufactured by YUKA SHELL EPOXY KABUSHIKI KAISHA) | 100 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 25 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-9).

Preparation Example 1-10 of Powder Coating

| | |
|---|---|
| Polyester Resin (Binder Resin 1-C) | 100 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |

The same procedures as in Preparation Example 1-9 of Powder Coating were carried out using the above components, to give a powder having an average particle size of 25 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-10).

Preparation Example 1-11 of Powder Coating

The same procedures as in Preparation Example 1-10 of Powder Coating were carried out except for using Binder Resin 1-D in place of Binder Resin 1-C for a polyester resin, to give a powder having an average particle size of 28 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-11).

Preparation Example 1-12 of Powder Coating

The same procedures as in Preparation Example 1-10 of Powder Coating were carried out except for using "ER-8123" (manufactured by Nippon Ester Co., Ltd.) in place of Binder Resin 1-C for a polyester resin, to give a powder having an average particle size of 28 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (1-12).

Example 1-1

50 parts by weight of Powder Coating (1-1) and 50 parts by weight of Powder Coating (1-2) were blended using a Henschel mixer. The resulting mixture was applied to a degreased steel substrate using an electrostatic sprayer, and the coated steel substrate was stoved at 180° C. for 20 minutes to form a coating film. The formed coating film had a homogeneous vermilion color.

Example 1-2

50 parts by weight of Powder Coating (1-1) and 50 parts by weight of Powder Coating (1-3) were blended using a Henschel mixer. The resulting mixture was applied to a degreased steel substrate using an electrostatic sprayer, and the coated steel substrate was stoved at 180° C. for 20 minutes to form a coating film. The formed coating film had a homogeneous green color.

Example 1-3

50 parts by weight of Powder Coating (1-7) and 50 parts by weight of Powder Coating (1-8) were blended using a Henschel mixer. The resulting mixture was applied to a degreased steel substrate using an electrostatic sprayer, and the coated steel substrate was stoved at 180° C. for 20 minutes to form a coating film. The formed coating film was homogeneous vermilion color.

Example 1-4

50 parts by weight of Powder Coating (1-1) and 50 parts by weight of Powder Coating (1-2) were blended using a Henschel mixer to prepare a powder coating composition. After a six-month period storage (under conditions of ambient temperature, normal pressure, and normal humidity), in the same manner as in Example 1-1, the resulting composition was applied to a degreased steel substrate using an electrostatic sprayer, and the coated steel substrate was stoved at 180° C. for 20 minutes to form a coating film. The formed coating film was homogeneous vermilion color, as in the case of Example 1-1.

Example 1-5

50 parts by weight of Powder Coating (1-9) and 50 parts by weight of Powder Coating (1-10) were blended using a Henschel mixer. The resulting mixture had a curing initiation temperature of 167° C. Also, the melt viscosities of each of the powder coatings at 150° C., the temperature corresponding to 90% of the curing initiation temperature, were 5 pa·s and 15 pa·s, respectively, the difference thereof being 10 pa·s. The resulting mixture was applied to a degreased steel substrate using an electrostatic sprayer, and the coated steel substrate was stoved at 180° C. for 20 minutes to form a coating film. The formed coating film was homogeneous vermilion color.

The resulting coating film had a gloss of 76, and a pencil hardness of 2H.

Example 1-6

50 parts by weight of Powder Coating (1-9) and 50 parts by weight of Powder Coating (1-11) were blended using a Henschel mixer. The resulting mixture had a curing initiation temperature of 167° C. Also, the melt viscosities of each of the powder coatings at 150° C., the temperature corresponding to 90% of the curing initiation temperature, were 5 pa·s and 11 pa·s, respectively, the difference thereof being 6 pa·s. The resulting mixture was applied to a degreased steel substrate using an electrostatic sprayer, and the coated steel substrate was stoved at 180° C. for 20 minutes to form a coating film. The formed coating film was homogeneous vermilion color.

The resulting coating film had a gloss of 82, and a pencil hardness of H.

Example 1-7

50 parts by weight of Powder Coating (1-9) and 50 parts by weight of Powder Coating (1-12) were blended using a Henschel mixer. The resulting mixture had a curing initiation temperature of 167° C. Also, the melt viscosities of each of the powder coatings at 150° C., the temperature corresponding to 90% of the curing initiation temperature, were 5 pa·s and 34 pa·s, respectively, the difference thereof being 29 pa·s. The resulting mixture was applied to a degreased steel substrate using an electrostatic sprayer, and the coated steel substrate was stoved at 180° C. for 20 minutes to form a coating film. The formed coating film was homogeneous vermilion color.

The resulting coating film had a gloss of 50, and a pencil hardness of HB, having somewhat poorer gloss and pencil hardness when compared with those of Examples 1-5 and 1-6.

Comparative Example 1-1

50 parts by weight of Powder Coating (1-4) and 50 parts by weight of Powder Coating (1-5) were blended using a Henschel mixer. The resulting mixture was applied to a degreased steel substrate in the same manner as in Example 1-1 to form a coating film. The resulting coating film had an uneven vermilion color.

Comparative Example 1-2

50 parts by weight of Powder Coating (1-4) and 50 parts by weight of Powder Coating (1-6) were blended using a Henschel mixer. The resulting mixture was applied to a degreased steel substrate in the same manner as in Example 1-1 to form a coating film. The resulting coating film had an uneven green color.

As is clear from the above results in Examples 1-1 to 1-7 and Comparative Examples 1-1 and 1-2, in the case of Comparative Examples 1-1 and 1-2 where two powder coatings each containing a polyester resin are blended and applied, no homogeneous hues can be obtained in the resulting coating film because each of the powder coatings is independently cured. On the other hand, in the case of Examples 1-1 to 1-7 where a powder coating containing an epoxy resin and a powder coating containing a polyester-polyamide resin or a polyester resin are blended and applied, each of the powder coatings does not have thermosetting properties alone, and each of the powder coatings is melted and sufficiently blended and then heat-cured during the stoving process to carry out curing reaction, thereby making it possible to give a coating film having a homogeneous hue. Also, in the case of Example 1-3 where a powder coating comprises the resin and a curing agent, a coating film with a homogeneous hue can be obtained. Further, even in a case of Example 1-4 where a composition comprising two powder coatings is used, a coating film with a homogeneous hue can be similarly obtained. Moreover, in cases of Examples 1-5 and 1-6, since the differences in the melt viscosities at a temperature of 90% of the curing initiation temperature of the mixture of the usable coating powders are adjusted within 20 pa·s, coating films with further improved gloss and pencil hardness can be obtained when compared with Example 1-7.

Resin Preparation Example 2-1

A three-liter four-necked flask equipped with a thermometer, a stainless stirring rod, a reflux condenser, and a nitrogen inlet tube was charged with 124 g (2 mol) of ethylene glycol, 520 g (5 mol) of neopentyl glycol, 830 g (5 mol) of terephthalic acid, and 1152 g (6 mol) of trimellitic anhydride, and the ingredients were heated to 220° C. and reacted.

The degree of polymerization was monitored from a softening point measured by the method according to ASTM E28-67, and the reaction was terminated when the softening point reached 90° C., to give a polyester resin. The resulting resin had an acid value of 83.4 KOH mg/g.

Also, the number of functional groups per molecule calculated from the number-average molecular weight (2800) and the acid value was 4.2. This resulting resin is referred to as "Binder Resin 2-A."

Incidentally, the number-average molecular weight and the number of functional groups per molecule were obtained by methods detailed below.

Number-Average Molecular Weight

Measured by GPC. More concretely, a column ("GMHXL+G3000HXL," manufactured by Tosoh Corporation) is stabilized in a thermostat at 40° C. Chloroform was flowed as an eluent through the column at a flow rate of 1 ml/minute, and 100 µl of a chloroform solution of a sample adjusted to a sample concentration of from 0.05 to 0.5% by weight was poured into the column to measure molecular weight distribution. The number-average molecular weight of the sample was calculated from the retention time of the peaks based on the calibration curve obtained by using several monodisperse polystyrenes as standards.

Number of Functional Groups

The number of functional groups per molecule is calculated from the number of moles of functional groups per gram obtained from the acid value (KOH mg/g) and the number of moles per gram obtained from the number-average molecular weight. Specifically, as shown below, using A and B values obtained below from Equations (1) and (2), the number of functional groups per molecule can be calculated by Equation (3).

$$A \text{ (mol/g)} = \text{Acid Value (KOH mg/g)}/56100 \quad (1)$$

$$B \text{ (mol/g)} = 1/\text{Number-Average Molecular Weight} \quad (2)$$

$$\text{Number of Function Groups} = A/B \quad (3)$$

Resin Preparation Example 2-2

A three-liter four-necked flask equipped with a thermometer, a stainless stirring rod, a reflux condenser, and a nitrogen inlet tube was charged with 124 g (2 mol) of ethylene glycol, 520 g (5 mol) of neopentyl glycol, 830 g (5 mol) of terephthalic acid, and 768 g (4 mol) of trimellitic anhydride, and the ingredients were heated to 220° C. and reacted.

The degree of polymerization was monitored from a softening point measured by the method according to ASTM E28-67, and the reaction was terminated when the softening point reached 90° C., to give a polyester resin. The resulting resin had an acid value of 66.4 KOH mg/g.

Also, the number of functional groups per molecule calculated from the number-average molecular weight (2700) and the acid value was 3.6. This resulting resin is referred to as "Binder Resin 2-B."

Resin Preparation Example 2-3

A three-liter four-necked flask equipped with a thermometer, a stainless stirring rod, a reflux condenser, and a nitrogen inlet tube was charged with 124 g (2 mol) of ethylene glycol, 520 g (5 mol) of neopentyl glycol, 1743 g (9 mol) of isophthalic acid, and 576 g (3 mol) of trimellitic anhydride, and the ingredients were heated to 220° C. and reacted.

The degree of polymerization was monitored from a softening point measured by the method according to ASTM E28-67, and the reaction was terminated when the softening point reached 100° C., to give a polyester resin. The resulting resin had an acid value of 52.5 KOH mg/g.

Also, the number of functional groups per molecule calculated from the number-average molecular weight (2570) and the acid value was 2.4. This resulting resin is referred to as "Binder Resin 2-C."

Resin Preparation Example 2-4

A three-liter four-necked flask equipped with a thermometer, a stainless stirring rod, a reflux condenser, and a nitrogen inlet tube was charged with 155 g (2.5 mol) of ethylene glycol, 624 g (6 mol) of neopentyl glycol, 134 g (1 mol) of trimethylolpropane, and 1660 g (10 mol) of terephthalic acid, and the ingredients were heated to 220° C. and reacted.

The degree of polymerization was monitored from a softening point measured by the method according to ASTM E28-67, and the reaction was terminated when the softening point reached 95° C., to give a polyester resin. The resulting resin had an acid value of 53.1 KOH mg/g.

Also, the number of functional groups per molecule calculated from the number-average molecular weight (2770) and the acid value was 2.6. This resulting resin is referred to as "Binder Resin 2-D."

Resin Preparation Example 2-5

A three-liter four-necked flask equipped with a thermometer, a stainless stirring rod, a reflux condenser, and a nitrogen inlet tube was charged with 124 g (2 mol) of ethylene glycol, 520 g (5 mol) of neopentyl glycol, and 1660 g (10 mol) of terephthalic acid, and the ingredients were heated to 220° C. and reacted.

The degree of polymerization was monitored from a softening point measured by the method according to ASTM E28-67, and the reaction was terminated when the softening point reached 90° C., to give a polyester resin. The resulting resin had an acid value of 44.5 KOH mg/g.

Also, the number of functional groups per molecule calculated from the number-average molecular weight (2020) and the acid value was 1.6. This resulting resin is referred to as "Binder Resin 2-E."

Resin Preparation Example 2-6

A three-liter four-necked flask equipped with a thermometer, a stainless stirring rod, a reflux condenser, and a nitrogen inlet tube was charged with 124 g (2 mol) of ethylene glycol, 520 g (5 mol) of neopentyl glycol, 1494 g (9 mol) of terephthalic acid, and 192 g (1 mol) of trimellitic anhydride, and the ingredients were heated to 220° C. and reacted.

The degree of polymerization was monitored from a softening point measured by the method according to ASTM E28-67, and the reaction was terminated when the softening point reached 90° C., to give a polyester resin. The resulting resin had an acid value of 43.6 KOH mg/g.

Also, the number of functional groups per molecule calculated from the number-average molecular weight (2300) and the acid value was 1.8. This resulting resin is referred to as "Binder Resin 2-F."

---

Preparation Example 2-1 of Powder Coating

| | |
|---|---|
| Epoxy Resin ("EPICOAT 1003F," manufactured by YUKA SHELL EPOXY KABUSHIKI KAISHA) | 100 parts by weight |
| Copper Phthalocyanine ("CYANINE BLUE-KRS," manufactured by SANYO COLOR WORKS, LTD.) | 8 parts by weight |
| Levelling Agent ("MODAFLOW POWDER 2000," manufactured by Monsanto) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 24 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (2-1).

Incidentally, the number of functional groups per molecule of the epoxy resin used, as calculated from the number-average molecular weight (1559) and the epoxy equivalency (768 g/equiv), was 2.0.

---

Preparation Example 2-2 of Powder Coating

| | |
|---|---|
| Polyester Resin (Binder Resin 2-A) | 100 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("MODAFLOW POWDER 2000," manufactured by Monsanto) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 23 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (2-2).

---

Preparation Example 2-3 of Powder Coating

| | |
|---|---|
| Polyester Resin (Binder Resin 2-B) | 100 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("MODAFLOW POWDER 2000," manufactured by Monsanto) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 26 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (2-3).

---

Preparation Example 2-4 of Powder Coating

| | |
|---|---|
| Polyester Resin (Binder Resin 2-C) | 100 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("MODAFLOW POWDER 2000," manufactured by Monsanto) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 27 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (2-4).

---

Preparation Example 2-5 of Powder Coating

| | |
|---|---|
| Polyester Resin (Binder Resin 2-D) | 100 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("MODAFLOW POWDER 2000," manufactured by Monsanto) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 25 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (2-5).

---

Preparation Example 2-6 of Powder Coating

| | |
|---|---|
| Polyester Resin (Binder Resin 2-E) | 100 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("MODAFLOW POWDER 2000," manufactured by Monsanto) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 22 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (2-6).

| Preparation Example 2-7 of Powder Coating | |
|---|---|
| Polyester Resin<br>(Binder Resin 2-F) | 100 parts<br>by weight |
| Dis-azo Yellow ("PIGMENT YELLOW ECY-210,"<br>manufactured by Dainichiseika Color &<br>Chemicals MFG. Co., Ltd.) | 8 parts<br>by weight |
| Levelling Agent ("MODAFLOW POWDER 2000,"<br>manufactured by Monsanto) | 1 part<br>by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 28 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (2-7).

| Preparation Example 2-8 of Powder Coating | |
|---|---|
| Epoxy Resin ("EPICOAT 1055,"<br>manufactured by YUKA SHELL EPOXY<br>KABUSHIKI KAISHA) | 100 parts<br>by weight |
| Copper Phthalocyanine<br>("CYANINE BLUE-KRS," manufactured by<br>SANYO COLOR WORKS, LTD.) | 8 parts<br>by weight |
| Levelling Agent ("MODAFLOW POWDER 2000,"<br>manufactured by Monsanto) | 1 part<br>by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 26 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (2-8).

Incidentally, the number of functional groups per molecule of the epoxy resin used, as calculated from the number-average molecular weight (1607) and the epoxy equivalency (872 g/equiv), was 1.8.

Example 2-1

50 parts by weight of Powder Coating (2-1) and 50 parts by weight of Powder Coating (2-2) were blended using a Henschel mixer. The resulting mixture was applied to a degreased steel substrate using an electrostatic sprayer, and the coated steel substrate was stoved at 180° C. for 20 minutes to form a coating film. The formed coating film had a homogeneous green color.

The resulting coating film had a pencil hardness of 2H and a solvent resistance of 0 μm.

Example 2-2

50 parts by weight of Powder Coating (2-1) and 50 parts by weight of Powder Coating (2-3) were blended using a Henschel mixer. The resulting mixture was applied to a degreased steel substrate using an electrostatic sprayer, and the coated steel substrate was stoved at 180° C. for 20 minutes to form a coating film. The formed coating film had a homogeneous green color.

The resulting coating film had a pencil hardness of 2H and a solvent resistance of 0 μm.

Example 2-3

50 parts by weight of Powder Coating (2-1) and 50 parts by weight of Powder Coating (2-4) were blended using a Henschel mixer. The resulting mixture was applied to a degreased steel substrate using an electrostatic sprayer, and the coated steel substrate was staved at 180° C. for 20 minutes to form a coating film. The formed coating film had a homogeneous green color.

The resulting coating film had a pencil hardness of H and a solvent resistance of −1 μm.

Example 2-4

50 parts by weight of Powder Coating (2-1) and 50 parts by weight of Powder Coating (2-5) were blended using a Henschel mixer. The resulting mixture was applied to a degreased steel substrate using an electrostatic sprayer, and the coated steel substrate was stoved at 180° C. for 20 minutes to form a coating film. The formed coating film had a homogeneous green color.

The resulting coating film had a pencil hardness of H and a solvent resistance of −1 μm.

Example 2-5

50 parts by weight of Powder Coating (2-1) and 50 parts by weight of Powder Coating (2-6) were blended using a Henschel mixer. The resulting mixture was applied to a degreased steel substrate using an electrostatic sprayer, and the coated steel substrate was staved at 180° C. for 20 minutes to form a coating film. The formed coating film had a homogeneous green color.

The resulting coating film had a pencil hardness of B and a solvent resistance of −17 μm.

Example 2-6

50 parts by weight of Powder Coating (2-1) and 50 parts by weight of Powder Coating (2-7) were blended using a Henschel mixer. The resulting mixture was applied to a degreased steel substrate using an electrostatic sprayer, and the coated steel substrate was stoved at 180° C. for 20 minutes to form a coating film. The formed coating film had a homogeneous green color.

The resulting coating film had a pencil hardness of B and a solvent resistance of −10 μm.

Example 2-7

50 parts by weight of Powder Coating (2-8) and 50 parts by weight of Powder Coating (2-2) were blended using a Henschel mixer. The resulting mixture was applied to a degreased steel substrate using an electrostatic sprayer, and the coated steel substrate was stoved at 180° C. for 20 minutes to form a coating film. The formed coating film was homogeneous green color.

The resulting coating film had a pencil hardness of HB and a solvent resistance of −7 μm.

Example 2-8

50 parts by weight of Powder Coating (2-7) and 50 parts by weight of Powder Coating (2-8) were blended using a Henschel mixer. The resulting mixture was applied to a degreased steel substrate using an electrostatic sprayer, and the coated steel substrate was stoved at 180° C. for 20 minutes to form a coating film. The formed coating film was homogeneous green color.

The resulting coating film had a pencil hardness of 2B and a solvent resistance of −30 μm.

As is clear from the above results in Examples 2-1 to 2-8, when the powder coatings containing two or more functional groups per molecule which can participate in the thermosetting reaction are used, it is found that the coating films having excellent pencil hardness and solvent resistance can be obtained.

Resin Preparation Example 3-1

A three-liter four-necked flask equipped with a thermometer, a stainless stirring rod, a reflux condenser, and a nitrogen inlet tube was charged with 155 g (2.5 mol) of ethylene glycol, 624 g (6 mol) of neopentyl glycol, 134 g (1 mol) of trimethylolpropane, and 1743 g (10.5 mol) of terephthalic acid, and the ingredients were heated to 220° C. and reacted.

The degree of polymerization was monitored from a softening point measured by the method according to ASTM E28-67, and the reaction was terminated when the softening point reached 95° C. The resulting resin had an acid value of 52.9 KOH mg/g. This resulting resin is referred to as "Binder Resin 3-A."

Resin Preparation Example 3-2

A three-liter four-necked flask equipped with a thermometer, a stainless stirring rod, a reflux condenser, and a nitrogen inlet tube was charged with 186 g (3 mol) of ethylene glycol, 728 g (7 mol) of neopentyl glycol, 1743 g (9 mol) of isophthalic acid, and 1920 g (10 mol) of trimellitic anhydride, and the ingredients were heated to 220° C. and reacted.

The degree of polymerization was monitored from a softening point measured by the method according to ASTM E28-67, and the reaction was terminated when the softening point reached 100° C. The resulting resin had an acid value of 52.0 KOH mg/g. This resulting resin is referred to as "Binder Resin 3-B."

| Preparation Example 3-1 of Powder Coating | |
|---|---|
| Epoxy Resin ("EPICOAT 1003F," manufactured by YUKA SHELL EPOXY KABUSHIKI KAISHA) | 100 parts by weight |
| Copper Phthalocyanine ("CYANINE BLUE-KRS," manufactured by SANYO COLOR WORKS, LTD.) | 8 parts by weight |
| Levelling Agent ("MODAFLOW POWDER 2000," manufactured by Monsanto) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 23 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (3-1). Powder Coating (3-1) had a softening point of 98° C.

| Preparation Example 3-2 of Powder Coating | |
|---|---|
| Polyester Resin (Binder Resin 3-A) | 100 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("MODAFLOW POWDER 2000," manufactured by Monsanto) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 23 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (3-2). Powder Coating (3-2) had a softening point of 93° C.

Preparation Example 3-3 of Powder Coating

The same procedures as in Preparation Example 3-1 of Powder Coating were carried out except for using "EPICOAT 1004AF" (manufactured by YUKA SHELL EPOXY KABUSHIKI KAISHA) in place of "EPICOAT 1003F" (manufactured by YUKA SHELL EPOXY KABUSHIKI KAISHA) for an epoxy resin, to give a powder having an average particle size of 23 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (3-3). Powder Coating (3-3) had a softening point of 99° C.

Preparation Example 3-4 of Powder Coating

The same procedures as in Preparation Example 3-2 of Powder Coating were carried out except for using Binder Resin 3-B in place of Binder Resin 3-A for a polyester resin, to give a powder having an average particle size of 22 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (3-4). Powder Coating (3-4) had a softening point of 101° C.

| Preparation Example 3-5 of Powder Coating | |
|---|---|
| Polyester Resin (Binder Resin 3-A) | 100 parts by weight |
| TGIC ("ARALDITE PT810," manufactured by Ciba Geigy AG) | 15 parts by weight |
| Copper Phthalocyanine ("CYANINE BLUE-KRS," manufactured by SANYO COLOR WORKS, LTD.) | 8 parts by weight |
| Levelling Agent ("MODAFLOW POWDER 2000," manufactured by Monsanto) | 1 part by weight |
| Benzoin | 0.5 parts by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 23 µm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (3-5). Powder Coating (3-5) had a softening point of 97° C.

Preparation Example 3-6 of Powder Coating

The same procedures as in Preparation Example 3-5 of Powder Coating were carried out except for using Dis-azo Yellow ("PIGMENT YELLOW ECY-210," manufactured by Dainichiseika Color & Chemicals MFG. Co., Ltd.) in place of Copper Phthalocyanine ("CYANINE BLUE-KRS," manufactured by SANYO COLOR WORKS, LTD.) for a pigment, to give a powder having an average particle size of 23 µm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (3-6). Powder Coating (3-6) had a softening point of 97° C.

Preparation Example 3-7 of Powder Coating

The same procedures as in Preparation Example 3-1 of Powder Coating were carried out except for using "YDCN-704" (manufactured by TOHTO KASEI CO., LTD.) in place of "EPICOAT 1003F" (manufactured by YUKA SHELL EPOXY KABUSHIKI KAISHA) for an epoxy resin, to give a powder having an average particle size of 23 µm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (3-7). Powder Coating (3-7) had a softening point of 96° C.

Preparation Example 3-8 of Powder Coating

The same procedures as in Preparation Example 3-6 of Powder Coating were carried out except for using Binder Resin 3-B in place of Binder Resin 3-A for a polyester resin, to give a powder having an average particle size of 23 µm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (3-8). Powder Coating (3-8) had a softening point of 100° C.

Example 3-1

50 parts by weight of Powder Coating (3-1) [softening point: 98° C.] and 50 parts by weight of Powder Coating (3-2) [softening point: 93° C.] were blended using a Henschel mixer. The resulting mixture had a curing initiation temperature of 135° C., and the difference between the softening point of Powder Coating (3-1), the higher softening point, and the curing initiation temperature of the resulting mixture was 37° C. The resulting mixture was applied to a degreased steel substrate using an electrostatic sprayer, and the coated steel substrate was stoved at 180° C. for 20 minutes to form a coating film. The formed coating film had a homogeneous green color. Incidentally, the resulting mixture had an exothermic peak temperature for curing reaction of 175° C.

Also, by using a differential scanning calorimeter "DSC Model 210" (manufactured by Seiko Instruments, Inc.), since an exothermic peak, obtained after raising the temperature from room temperature to 180° C. and then keeping at 180° C., disappeared in no more than 15 minutes from initiation of the temperature rise, it is considered that the curing reaction is sufficiently terminated under the above stoving conditions.

The resulting coating film had a gloss of 80 and a pencil hardness of H.

Example 3-2

50 parts by weight of Powder Coating (3-3) [softening point: 99° C.] and 50 parts by weight of Powder Coating (3-4) [softening point: 101° C.] were blended using a Henschel mixer. The resulting mixture had a curing initiation temperature of 148° C., and the difference between the softening point of Powder Coating (3-4), the higher softening point, and the curing initiation temperature of the resulting mixture was 47° C. The resulting mixture was applied to a degreased steel substrate using an electrostatic sprayer, and the coated steel substrate was stoved at 180° C. for 20 minutes to form a coating film. The formed coating film had a homogeneous green color. Incidentally, the resulting mixture had an exothermic peak temperature for curing reaction of 184° C.

The resulting coating film had a gloss of 89 and a pencil hardness of 2H.

Example 3-3

50 parts by weight of Powder Coating (3-1) [softening point: 98° C.] and 50 parts by weight of Powder Coating (3-4) [softening point: 101° C.] were blended using a Henschel mixer. The resulting mixture had a curing initiation temperature of 133° C., and the difference between the softening point of Powder Coating (3-4), the higher softening point, and the curing initiation temperature of the resulting mixture was 32° C. The resulting mixture was applied to a degreased steel substrate using an electrostatic sprayer, and the coated steel substrate was staved at 180° C. for 20 minutes to form a coating film. The formed coating film had a homogeneous green color. Incidentally, the resulting mixture had an exothermic peak temperature for curing reaction of 176° C.

The resulting coating film had a gloss of 86 and a pencil hardness of H.

Example 3-4

50 parts by weight of Powder Coating (3-5) [softening point: 97° C.] and 50 parts by weight of Powder Coating (3-6) [softening point: 97° C.] were blended using a Henschel mixer. The resulting mixture had a curing initiation temperature of 108° C., and the difference between the softening point of Powder Coating (3-5) and Powder Coating (3-6) and the curing initiation temperature of the resulting mixture was 11° C. The resulting mixture was applied to a degreased steel substrate using an electrostatic sprayer, and the coated steel substrate was stoved at 180° C. for 20 minutes to form a coating film. The formed coating film had a homogeneous green color. Incidentally, the resulting mixture had an exothermic peak temperature for curing reaction of 148° C.

The resulting coating film had a gloss of 88 and a pencil hardness of 2H.

Comparative Example 3-1

50 parts by weight of Powder Coating (3-2) [softening point: 93° C.] and 50 parts by weight of Powder Coating (3-7) [softening point: 96° C.] were blended using a Henschel mixer. The resulting mixture had a curing initiation temperature of 100° C., and the difference between the softening point of Powder Coating (3-7), the higher softening point, and the curing initiation temperature of the resulting mixture was 4° C. The resulting mixture was applied to a degreased steel substrate using an electrostatic sprayer, and the coated steel substrate was stoved at 180° C. for 20 minutes to form a coating film. The formed coating film had an inhomogeneous hue to be confirmed to have yellow particles and cyan particles.

The resulting coating film had a gloss of 70 and a pencil hardness of HB.

Comparative Example 3-2

50 parts by weight of Powder Coating (3-4) [softening point: 101° C.] and 50 parts by weight of Powder Coating (3-7) [softening point: 96° C.] were blended using a Henschel mixer. The resulting mixture had a curing initiation temperature of 105° C., and the difference between the softening point of Powder Coating (3-4), the higher softening point, and the curing initiation temperature of the resulting mixture was 4° C. The resulting mixture was applied to a degreased steel substrate using an electrostatic sprayer, and the coated steel substrate was stoved at 180° C. for 20 minutes to form a coating film. The formed coating film had an inhomogeneous hue to be confirmed to have yellow particles and cyan particles.

The resulting coating film had a gloss of 61 and a pencil hardness of H.

Comparative Example 3-3

50 parts by weight of Powder Coating (3-5) [softening point: 97° C.] and 50 parts by weight of Powder Coating (3-8) [softening point: 100° C.] were blended using a Henschel mixer. The resulting mixture had a curing initiation temperature of 108° C., and the difference between the softening point of Powder Coating (3-8), the higher softening point, and the curing initiation temperature of the resulting mixture was 8° C. The resulting mixture was applied to a degreased steel substrate using an electrostatic sprayer, and the coated steel substrate was stoved at 180° C. for 20 minutes to form a coating film. The formed coating film had an inhomogeneous hue to be confirmed to have yellow particles and cyan particles.

The resulting coating film had a gloss of 80 and a pencil hardness of 2H.

As is clear from above results in Examples 3-1 to 3-4 and Comparative Examples 3-1 to 3-3, since a difference between the softening point of the powder coating having the highest softening point and a curing initiation temperature of a mixture of two or more powder coatings is not less than 10° C., in Examples 3-1 to 3-4, each of the resulting coating films has a homogeneous hue, and also has excellent gloss and pencil hardness. On the other hand, in Comparative Examples 3-1 to 3-3, since the difference is less than 10° C., each of the resulting coating films having a homogeneous hue cannot be obtained, though sufficient levels in gloss and pencil hardness can be obtained.

Resin Preparation Example 4-1

A three-liter four-necked flask equipped with a thermometer, a stainless stirring rod, a reflux condenser, and a nitrogen inlet tube was charged with 155 g (2.5 mol) of ethylene glycol, 624 g (6 mol) of neopentyl glycol, 134 g (1 mol) of trimethylolpropane, and 1743 g (10.5 mol) of terephthalic acid, and the ingredients were heated to 220° C. and reacted.

The degree of polymerization was monitored from a softening point measured by the method according to ASTM E28-67, and the reaction was terminated when the softening point reached 95° C. The resulting resin had an acid value of 52.9 KOH mg/g. This resulting resin is referred to as "Binder Resin 4-A."

Resin Preparation Example 4-2

A three-liter four-necked flask equipped with a thermometer, a stainless stirring rod, a reflux condenser, and a nitrogen inlet tube was charged with 186 g (3 mol) of ethylene glycol, 728 g (7 mol) of neopentyl glycol, 1743 g (9 mol) of isophthalic acid, and 1920 g (10 mol) of trimellitic anhydride, and the ingredients were heated to 220° C. and reacted.

The degree of polymerization was monitored from a softening point measured by the method according to ASTM E28-67, and the reaction was terminated when the softening point reached 100° C. The resulting resin had an acid value of 52.0 KOH mg/g. This resulting resin is referred to as "Binder Resin 4-B."

| Preparation Example 4-1 of Powder Coating | |
|---|---|
| Epoxy Resin ("YDCN-704," manufactured by TOHTO KASEI CO., LTD.) | 100 parts by weight |
| Copper Phthalocyanine ("CYANINE BLUE-KRS," manufactured by SANYO COLOR WORKS, LTD.) | 8 parts by weight |
| Levelling Agent ("MODAFLOW POWDER 2000," manufactured by Monsanto) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 23 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (4-1). Powder Coating (4-1) had a softening point of 96° C.

| Preparation Example 4-2 of Powder Coating | |
|---|---|
| Polyester Resin (Binder Resin 4-A) | 100 parts by weight |
| Dis-azo Yellow ("PIGMENT YELLOW ECY-210," manufactured by Dainichiseika Color & Chemicals MFG. Co., Ltd.) | 8 parts by weight |
| Levelling Agent ("MODAFLOW POWDER 2000," manufactured by Monsanto) | 1 part by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 23 μm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (4-2). Powder Coating (4-2) had a softening point of 93° C.

Preparation Example 4-3 of Powder Coating

| | |
|---|---|
| Polyester Resin | 100 parts |
| (Binder Resin 4-A) | by weight |
| TGIC ("ARALDITE PT810," | 15 parts |
| manufactured by Ciba Geigy AG) | by weight |
| Copper Phthalocyanine | 8 parts |
| ("CYANINE BLUE-KRS," manufactured by | by weight |
| SANYO COLOR WORKS, LTD.) | |
| Levelling Agent ("MODAFLOW POWDER 2000," | 1 part |
| manufactured by Monsanto) | by weight |
| Benzoin | 0.5 parts |
| | by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 23 $\mu$m. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (4-3). Powder Coating (4-3) had a softening point of 97° C.

Preparation Example 4-4 of Powder Coating

| | |
|---|---|
| Polyester Resin | 100 parts |
| (Binder Resin 4-B) | by weight |
| TGIC ("ARALDITE PT810," | 15 parts |
| manufactured by Ciba Geigy AG) | by weight |
| Dis-azo Yellow ("PIGMENT YELLOW ECY-210," | 8 parts |
| manufactured by Dainichiseika Color & | by weight |
| Chemicals MFG. Co., Ltd.) | |
| Levelling Agent ("MODAFLOW POWDER 2000," | 1 part |
| manufactured by Monsanto) | by weight |
| Benzoin | 0.5 parts |
| | by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 23 $\mu$m. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (4-4). Powder Coating (4-4) had a softening point of 100° C.

Example 4-1

50 parts by weight of Powder Coating (4-1) and 50 parts by weight of Powder Coating (4-2) were blended using a Henschel mixer, and the resulting mixture was applied to a degreased steel substrate using an electrostatic sprayer, and the coated steel substrate was kept standing at 98° C. for 10 minutes to sufficiently heat and melt the applied powder coatings. Thereafter, the coated steel substrate was stoved at 180° C. for 20 minutes to form a coating film. The formed coating film had a homogeneous green color. Incidentally, the applied powder coatings had a curing initiation temperature of 100° C. and an exothermic peak temperature for curing reaction of 160° C.

The resulting coating film had a gloss of 90 and a pencil hardness of H.

Example 4-2

50 parts by weight of Powder Coating (4-3) and 50 parts by weight of Powder Coating (4-4) were blended using a Henschel mixer, and the resulting mixture was applied to a degreased steel substrate using an electrostatic sprayer, and the coated steel substrate was kept standing at 104° C. for 20 minutes to sufficiently heat and melt the applied powder coatings. Thereafter, the coated steel substrate was stoved at 180° C. for 20 minutes to form a coating film. The formed coating film had a homogeneous green color. Incidentally, the applied powder coatings had a curing initiation temperature of 108° C. and an exothermic peak temperature for curing reaction of 145° C.

The resulting coating film had a gloss of 90 and a pencil hardness of 2H.

Comparative Example 4-1

50 parts by weight of Powder Coating (4-1) and 50 parts by weight of Powder Coating (4-2) were blended using a Henschel mixer. The resulting mixture was applied to a degreased steel substrate using an electrostatic sprayer, and the coated steel substrate was stoved at 180° C. for 20 minutes to form a coating film. The formed coating film had an inhomogeneous hue, a part of which yellow particles and cyan particles were observed.

The resulting coating film had a gloss of 70 and a pencil hardness of HB.

Comparative Example 4-2

50 parts by weight of Powder Coating (4-3) and 50 parts by weight of Powder Coating (4-4) were blended using a Henschel mixer. The resulting mixture was applied to a degreased steel substrate using an electrostatic sprayer, and the coated steel substrate was stoved at 180° C. for 20 minutes to form a coating film. The formed coating film had an inhomogeneous hue to be confirmed by gloss to have yellow particles and cyan particles.

The resulting coating film had a gloss of 80 and a pencil hardness of 2H.

As is clear from the above results in Examples 4-1 and 4-2 and Comparative Examples 4-1 and 4-2, when compared with Comparative Examples 4-1 and 4-2 where the applied powder coatings to form a coating film are directly stoved, in Examples 4-1 and 4-2, since the coating film is formed by heating and melting the applied powder coatings, and then stoving the powder coatings to carry out curing reaction, the resulting coating film has a homogeneous hue and also has excellent gloss and pencil hardness.

Preparation Example 5-1 of Powder Coating

| | |
|---|---|
| Epoxy Acrylate Resin ("RIPOXY VR-40," | 98 parts |
| manufactured by Showa Kobunshi; | by weight |
| softening point: 75° C.) | |
| Benzoin Isopropyl Ether | 2 parts |
| ("NISSOCURE IBPO," manufactured by | by weight |
| Nippon Soda Co., Ltd.) | |
| Titanium Oxide ("TIPAQUE CR-90," | 30 parts |
| manufactured by ISHIHARA SANGYO | by weight |
| KAISHA, LTD.) | |
| Levelling Agent ("ACRONAL 4F," | 1 part |
| manufactured by BASF) | by weight |

The above components were previously blended using a Super Mixer, and the resulting mixture was kneaded using a Buss Ko-kneader (manufactured by Buss (Japan) Ltd.). The kneaded mixture was cooled, the cooled product was pulverized using a pulverizer "PJM" (manufactured by Nippon Pneumatic MFG, Co., Ltd.), to give a powder having an average particle size of 23.7 µm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (5-1).

Incidentally, the softening points of the epoxy acrylate resins used in each of Powder Coatings (5-1) to (5-3) are measured by a method according to ASTM E28-67.

Powder Coating (5-1) was applied to a degreased steel plate using an electrostatic sprayer. A capacitor having an electric capacitance (C) of 0.047 µF was connected between the coating object and the ground. The powder coating applied to the surface of the object was removed by airblowing. The mass (M) of the powder coating removed from the coating surface was obtained by measuring the masses of the coating object before and after the removal of powder coating, and calculating the difference of the masses. The mass (M) was found to be 0.0283 g. The difference in voltage (V) in the capacitor owing to the efflux of electric charges (Q=CV) caused by the removal of the powder coating was measured using an electrometer "TR 8411" (manufactured by Advantest Corporation). The difference in voltage was found to be +4.58 V. From the values obtained, the triboelectric charge (Q/M) was calculated, and the triboelectric charge was found to be −7.6 µC/g.

Preparation Example 5-2 of Powder Coating

| | |
|---|---|
| Epoxy Acrylate Resin ("RIPOXY VR-40," manufactured by Showa Kobunshi; softening point: 75° C.) | 96 parts by weight |
| Benzoin Isopropyl Ether ("NISSOCURE IBPO," manufactured by Nippon Soda Co., Ltd.) | 4 parts by weight |
| Carmine 6B ("SUMIKAPRINT CARMINE 6BC," manufactured by Sumitomo Chemical Co., Ltd.) | 8 parts by weight |
| Levelling Agent ("ACRONAL 4F," manufactured by BASF) | 1 part by weight |

The same procedures as in Preparation Example 5-1 of Powder Coating were carried out using the above components, to give a powder having an average particle size of 25.6 µm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (5-2).

The same procedures as in Preparation Example 5-1 of Powder Coating were carried out to obtain the triboelectric charge of Powder Coating (5-2). The triboelectric charge was found to be −8.1 µC/g.

Preparation Example 5-3 of Powder Coating

| | |
|---|---|
| Epoxy Acrylate Resin ("RIPOXY VR-40," manufactured by Showa Kobunshi; softening point: 75° C.) | 96 parts by weight |
| Benzoin Isopropyl Ether ("NISSOCURE IBPO," manufactured by Nippon Soda Co., Ltd.) | 4 parts by weight |

-continued

Preparation Example 5-3 of Powder Coating

| | |
|---|---|
| Dis-azo Yellow ("PIGMENT YELLOW ECY-210," manufactured by Dainichiseika Color & Chemicals MFG. Co., Ltd.) | 8 parts by weight |
| Levelling Agent ("ACRONAL 4F," manufactured by BASF) | 1 part by weight |

The same procedures as in Preparation Example 5-1 of Powder Coating were carried out using the above components, to give a powder having an average particle size of 25.1 µm. To 100 parts by weight of the resulting powder, 0.3 parts by weight of silica "AEROSIL R972" (manufactured by Nippon Aerosil Co., Ltd.) were added, and the mixture was uniformly blended using a Henschel mixer, to give Powder Coating (5-3).

The same procedures as in Preparation Example 5-1 of Powder Coating were carried out to obtain the triboelectric charge of Powder Coating (5-3). The triboelectric charge was found to be −8.8 µC/g.

Example 5-1

10 parts by weight of Powder Coating (5-1), 45 parts by weight of Powder Coating (5-2), and 45 parts by weight of Powder Coating (5-3) were blended using a Henschel mixer. The resulting mixture was applied to a degreased steel substrate using an electrostatic sprayer, and the coated steel substrate was kept standing at 85° C. for 20 minutes to sufficiently heat and melt the applied powder coatings. Thereafter, the powder coatings were cured by adjusting an UV accumulation amount to 250 mJ/cm$^2$ to form a coating film. The formed coating film had a homogeneous vermilion color.

The resulting coating film had a gloss of 85, and a pencil hardness of HB.

Comparative Example 5-1

10 parts by weight of Powder Coating (5-1), 45 parts by weight of Powder Coating (5-2), and 45 parts by weight of Powder Coating (5-3) were blended using a Henschel mixer. The resulting mixture was applied to a degreased steel substrate using an electrostatic sprayer, and the coated steel substrate was placed in an atmosphere of 85° C., and concurrently the powder coatings were cured by adjusting an UV accumulation amount to 250 mJ/cm$^2$ to form a coating film. The formed coating was confirmed by gross examination to have color separation.

The resulting coating film had a gloss of 25, and a pencil hardness of B.

As is clear from the above results in Example 5-1 and Comparative Example 5-1, when compared with Comparative Example 5-1 where the heating and the curing of the coating powders to form a coating film were concurrently carried out, in Example 5-1, since the coating film is formed by heating and melting the applied powder coatings, and then curing the powder coatings, the resulting coating film has a homogenous hue and also has excellent gloss and pencil hardness.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combination of powder coatings usable in a coating method comprising mixing two or more powder coatings of which each color is different, wherein
   (1) each of said powder coatings does not have thermosetting properties alone at a temperature of 250° C. or less,
   (2) each of said powder coatings comprises a resin having two or more functional groups per molecule which participates in a thermosetting reaction with the functional groups of the other powder coating(s)
   (3) each of said two or more powder coatings heat-cure when mixed with each other at a temperature of 250° C. or less, wherein said heat-curing is a result of said two or more powder coatings reacting with each other, thereby providing a coating film having a homogeneous hue.

2. The combination of powder coatings according to claim 1, wherein the combination consists of two powder coatings of which each color is different, and wherein one powder coating contains one or more resins selected from the group consisting of acrylic resins having one or more members selected from the group consisting of carboxyl groups and amino groups, polyester resins having one or more carboxyl groups, polyester-polyamide resins having one or more members selected from the group consisting of carboxyl groups and amino groups, polyamide resins having one or more members selected from the group consisting of carboxyl groups and amino groups, resins having one or more phenolic hydroxyl groups, and acid anhydride resins having one or more acid anhydride groups; and another powder coating contains one or more resins selected from the group consisting of epoxy resins having one or more epoxy groups, acrylic resins having one or more glycidyl groups, and resins having one or more unsaturated bonds.

3. The combination of powder coatings according to claim 1, wherein a difference in melt viscosities of said two or more powder coatings is not more than 20 pa·s at a temperature corresponding to 90% of a curing initiation temperature of a mixture of said two or more powder coatings of which each color is different.

4. A powder coating composition comprising two or more powder coatings of which each color is different, wherein
   (1) each of said powder coatings does not have thermosetting properties alone at a temperature of 250° C. or less,
   (1) each of said powder coatings comprises a resin having two or more functional groups per molecule which participates in a thermosetting reaction with the functional groups of the other powder coating(s)
   (3) each of said two or more powder coatings heat-cure when mixed with each other at a temperature of 250° C. or less, wherein said heat-curing is a result of said two or more powder coatings reacting with each other, thereby providing a coating film having a homogeneous hue.

5. The powder coating composition according to claim 4, wherein the powder coating composition consists of two powder coatings of which each color is different, and wherein one powder coating contains one or more resins selected from the group consisting of acrylic resins having one or more members selected from the group consisting of carboxyl groups and amino groups, polyester resins having one or more carboxyl groups, polyester-polyamide resins having one or more members selected from the group consisting of carboxyl groups and amino groups, polyamide resins having one or more members selected from the group consisting of carboxyl groups and amino groups, resins having one or more phenolic hydroxyl groups, and acid anhydride resins having one or more acid anhydride groups; and another powder coating contains one or more resins selected from the group consisting of epoxy resins having one or more epoxy groups, acrylic resins having one or more glycidyl groups, and resins having one or more unsaturated bonds.

6. The powder coating composition according to claim 4, wherein a difference in melt viscosities of said two or more powder coatings is not more than 20 pa·s at a temperature corresponding to 90% of a curing initiation temperature of a mixture of said two or more powder coatings of which each color is different.

* * * * *